United States Patent [19]
Golenski

[11] 3,991,485
[45] Nov. 16, 1976

[54] DRIVING TEST RANGE

[75] Inventor: Stephen S. Golenski, New Milford, Pa.

[73] Assignee: The Singer Company, Binghamton, N.Y.

[22] Filed: Sept. 17, 1975

[21] Appl. No.: 614,264

[52] U.S. Cl. .................................. 35/11; 340/23; 340/38 R
[51] Int. Cl.² ..................................... G09B 11/02
[58] Field of Search .............. 35/11, 29 R; 116/117; 340/22, 23, 24, 31 R, 32, 52 R, 51, 61, 62, 38 R, 38 L, 225

[56] References Cited
UNITED STATES PATENTS

| | | | |
|---|---|---|---|
| 3,546,696 | 12/1970 | Waters et al. | 340/23 X |
| 3,608,210 | 9/1971 | O'Shea | 35/11 R |
| 3,714,649 | 1/1973 | Brouwer et al. | 340/23 X |
| 3,795,907 | 3/1974 | Edwards | 340/23 X |
| 3,846,704 | 11/1974 | Bessette | 35/29 R X |
| 3,849,908 | 11/1974 | Sturgeon | 35/11 R |

*Primary Examiner*—Richard C. Pinkham
*Assistant Examiner*—Vance Y. Hum
*Attorney, Agent, or Firm*—Ronald Reichman; James C. Kesterson

[57] ABSTRACT

This invention relates to an automobile driving range so laid out that the ability of a driver to carry on normal motor vehicle driving activities can be automatically tested and graded. The driving range contains two-way traffic lanes separated by sensing switches so that a vehicle's presence in the improper lane is readily detected. Each vehicle temporarily has attached to it a radio transmitter having a very limited range and transmitting an identifying signal for the particular vehicle. Buried throughout the range are sensing loops which receive the transmissions from the vehicles and combine the vehicle identification with vehicle operation information being generated at the moment. In those portions of the driving range where driving tracks cross, the intersections can be controlled by stop signs, traffic lights, or any other traffic control devices. Motion detectors at such intersections indicate whether or not a vehicle is in motion at any time. The loop adjacent such intersections receives transmitted information to identify the particular vehicles at the intersection. Similarly, portions of the track are arranged to provide areas in which vehicles may make U-turns, and other areas are provided for parking tests. The entire range has sensing devices mounted within it which are connected to a data information center where all of the information concerning each individual vehicle is gathered together to produce a final test result for each driver.

12 Claims, 10 Drawing Figures

DRIVING TEST RANGE

BACKGROUND OF THE INVENTION

1. Field of the Invention

This invention relates to testing devices and, more particularly, to automatic devices for testing the ability of new and experienced vehicle drivers to handle vehicles in a wide variety of situations.

2. Description of the Prior Art

Heretofore, most vehicle driver test ranges were merely areas set aside in which test examiners rode in the vehicles with the applicants. In such situations, the test could proceed on city streets in normal traffic or it could be in an isolated area where little or no traffic was encountered. In those situations where the test takes place on city streets, both the examiner and the applicant may often be in serious danger. Seldom are the test vehicles so identified and the drivers proceeding along the same streets on their day-to-day affairs do not realize that the vehicle coming toward them or immediately ahead of them may contain a neophyte driver who is being tested. Obviously, in such situations many surprise encounters may occur. Further, in the prior art, the grade attained by any applicant is subjective and often dependent upon the emotional condition of the examiner. As a result, the United States is filled with incompetent drivers.

SUMMARY OF THE INVENTION

It is desirable to provide a special test area where all new applicants for drivers licenses may be tested automatically and objectively without regard to the physical, mental or emotional condition of any examiner. This invention provides a range and apparatus to accomplish this objective.

It is an object of this invention to provide a new and improved system for testing applicants.

It is another object of this invention to provide a new and improved system and apparatus for testing vehicle drivers.

It is a further object of this invention to provide a new and improved test range for automatically testing the ability of applicants for drivers licenses and the like.

Further objects and advantages of this invention will become more apparent as the following description proceeds, which invention should be considered together with the accompanying drawings.

DETAILED DESCRIPTION OF A PREFERRED EMBODIMENT

Figure 1:
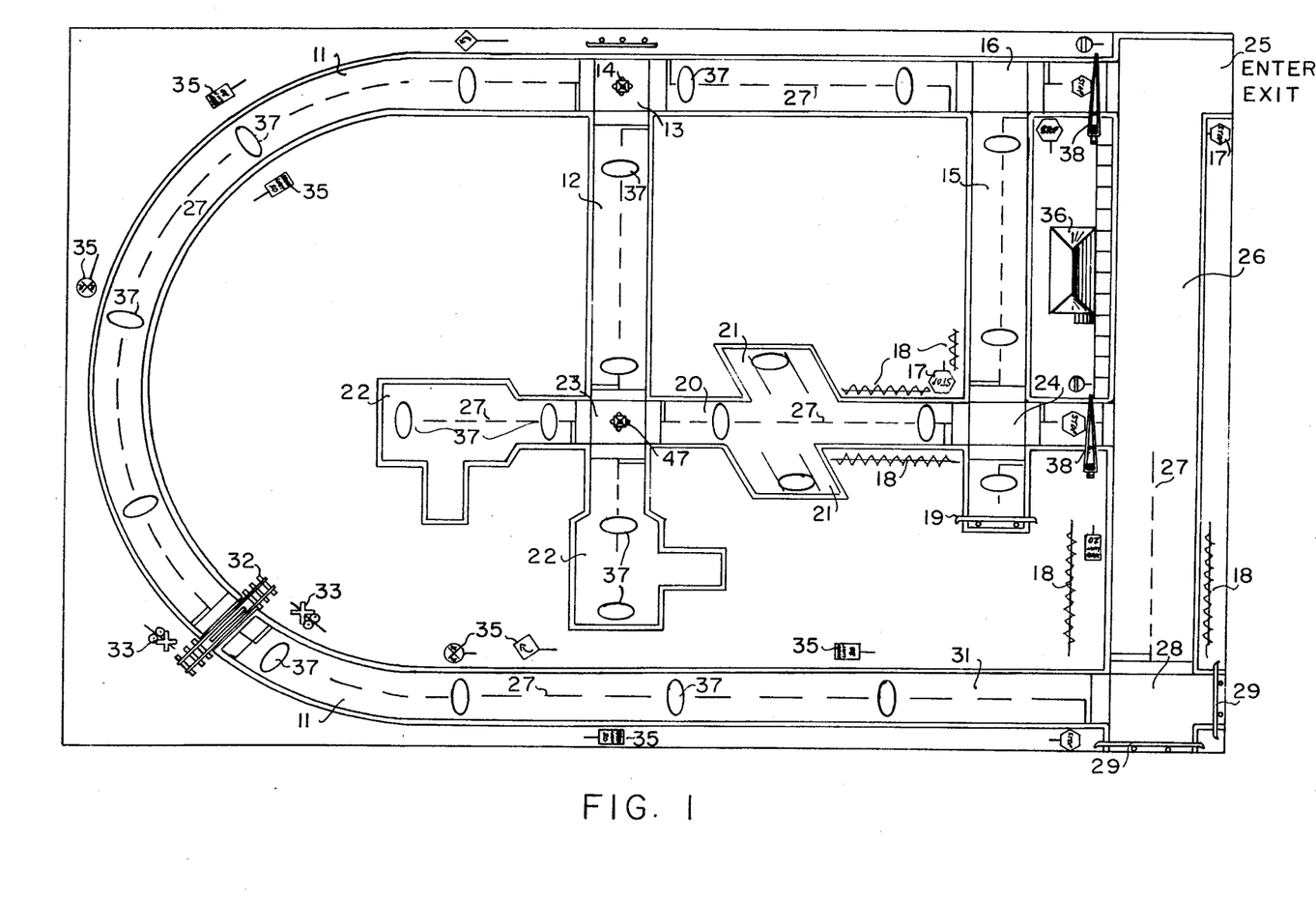
FIG. 1 is a plan view of a driver test range.

Referring now to the drawings in detail and more particularly to FIG. 1, the reference character 11 designates one driving lane of a two-way street, and the second lane is designated 31. A cross track 12 intersects with the lanes 11 and 31 at an intersection 13 which is controlled by a traffic signal 14. A second cross track 15 intersects the lanes 11 and 31 at an intersection 16 which is controlled by a stop sign and intersects with another track 20 at another intersection 24. The track 20 comprises two diagonal parking areas 21 and a U-turn area 22. Track 20 intersects track 12 at an intersection 23 controlled by a traffic light, and track 12 ends in a second U-turn area 22. The intersection 24 has visibility barriers 18 adjacent it, and at the end of the track 15 there is a crash barrier rail 19 of the type found on major highways. A portion 26 of the lanes 11 and 31, which are generally horseshoe shaped, comprises the base of the horseshoe and passes in front of a control tower 36 housing the testing equipment and the examiners. The intersection of the portion 26 with the lanes 11 and 31 is controlled by a highway gate 38, as is the intersection of the portion 26 with the track 20. Stop signs control traffic at the gates 38. Scattered around the track are normal traffic signs 35 which may indicate the speed limits, road conditions ahead, railroad crossings and the like. A railroad track 32 crosses the lanes 11 and 31, and this crossing is controlled by regular railroad crossarm signals 33. Applicants enter and leave the range through an entrance 25 adjacent the control tower 36.

Basically the test range of this invention is designed to permit applicants in their own vehicles to enter at 25 and pull up to the control tower 36. When the applicant enters the control tower, he submits his application to take the test and one of the instructors accompanies him to his vehicle to attach to his vehicle a small, portable transmitter. The transmitter is battery operated, has a very low range, and transmits vehicle identifying information as well as the state of the vehicle's directional signals. The transmitter may take any suitable form, such as that shown in FIG. 8, and may be mounted on the bumper or other convenient portion of the vehicle by means of straps, elastic bands, clamps, or the like. The applicant receives his instructions at the same time and is shown how to proceed around the course and take the various tests incorporated therein.

Assume that the test vehicle proceeds along the portion 26 from in front of the control tower 36 downwardly as shown in FIG. 1. At the intersection 28 the vehicle makes a right-hand turn into the lane 31 and proceeds within the speed limits posted along the track 31 until it reaches the railroad intersection 32. The railroad crossing signs 33 may be operated or not under the control of the instructors in the control tower 36 who can readily observe the vehicle in motion. Should the railroad signals 33 be operated and the vehicle not stop, this information is sensed and transmitted to the control tower 36 together with the identifying information of the vehicle itself. After crossing the tracks 32, the vehicle can proceed around the curved portion of the track to the intersection 13 which is controlled by the traffic signal 14. At various intervals along the roadway loops 37 are buried in the roadway itself to pick up the transmitted output of the portable transmitter mounted on the vehicle. Reception by the loops 37 is transmitted to the control tower 36 and identifies the vehicle and its path. Also, a computer in the control tower 36 receives the successive pickups of the identifying information from the vehicle, measures the time intervals between successive pickups and computes the vehicle speed to determine whether or not the vehicle is travelling above the posted speed limit. The traffic signal 14 is also under the control of the personnel in the control tower 36. If the traffic signal 14 is so controlled that the vehicle traveling along the track 31 has a red light, this information together with the information as to whether or not that vehicle stopped is also detected and transmitted to the control tower 36. At the intersection 13, the vehicle may make a second right turn and proceed along the track 12 to the intersection 23 which is also controlled by a traffic signal. At the intersection 23, the vehicle may make a right turn or proceed straight ahead to the U-turn area 22. The U-turn area 22 is a widened area which is so designed as to permit a vehicle driver to make a U-turn by pulling forward, turning his wheels, backing, turning his wheels and pulling forward again repeatedly until his vehicle has made a complete 360° turn. Sensors buried in the roadway portion 22 indicate whether or not the vehicle has struck the curb during any of the maneuvers. In addition, a portion of the area 22 may be used to test the driver on parallel parking. After completing the maneuvers in the portion 22, the vehicle may proceed along the track 20 to either of the diagonal parking areas 21. At the diagonal parking areas 21, the driver must park the car between the lane markers without extending into an adjacent lane. Sensing devices are provided to indicate when the vehicle is in proper position or has crossed the lines into the adjacent lanes. After diagonal parking, the vehicle may pull out into the track 20 and proceed past the visual barriers 18 to the intersection 24 where it encounters the movable highway gates 38. The highway gates 38 are also under the control of the control tower 36 and may be raised or lowered to control the movement of the vehicle itself. After passing the gate 38, the vehicle may again pull up adjacent the control tower 36 where the driver may receive the results of his test. Other sequences of steps may be followed than that discussed above. In addition, the driver is tested upon his ability to remain in lane and his signalling at turns.

The test range shown in FIG. 1 is so constructed that a plurality of vehicles may use the range at the same time, and several applicants may be tested simultaneously. One vehicle may proceed along the lane 31 in one direction while a second vehicle, or third vehicle, proceeds in the opposite direction along lane 11. At the same time, additional vehicles may be parking making U-turns, and proceeding along the other test portions of the track. Since the entire test range is checked automatically by the use of automatic digital equipment, the identifying codes for each vehicle readily enable the monitoring equipment at the control tower 36 to keep the individual vehicles and their maneuvers separate and distinct. One such range which has been constructed occupies a space measuring 400 feet by 250 feet. The entire test range can be fitted into an area which is about the size of two city blocks.

Figure 2:
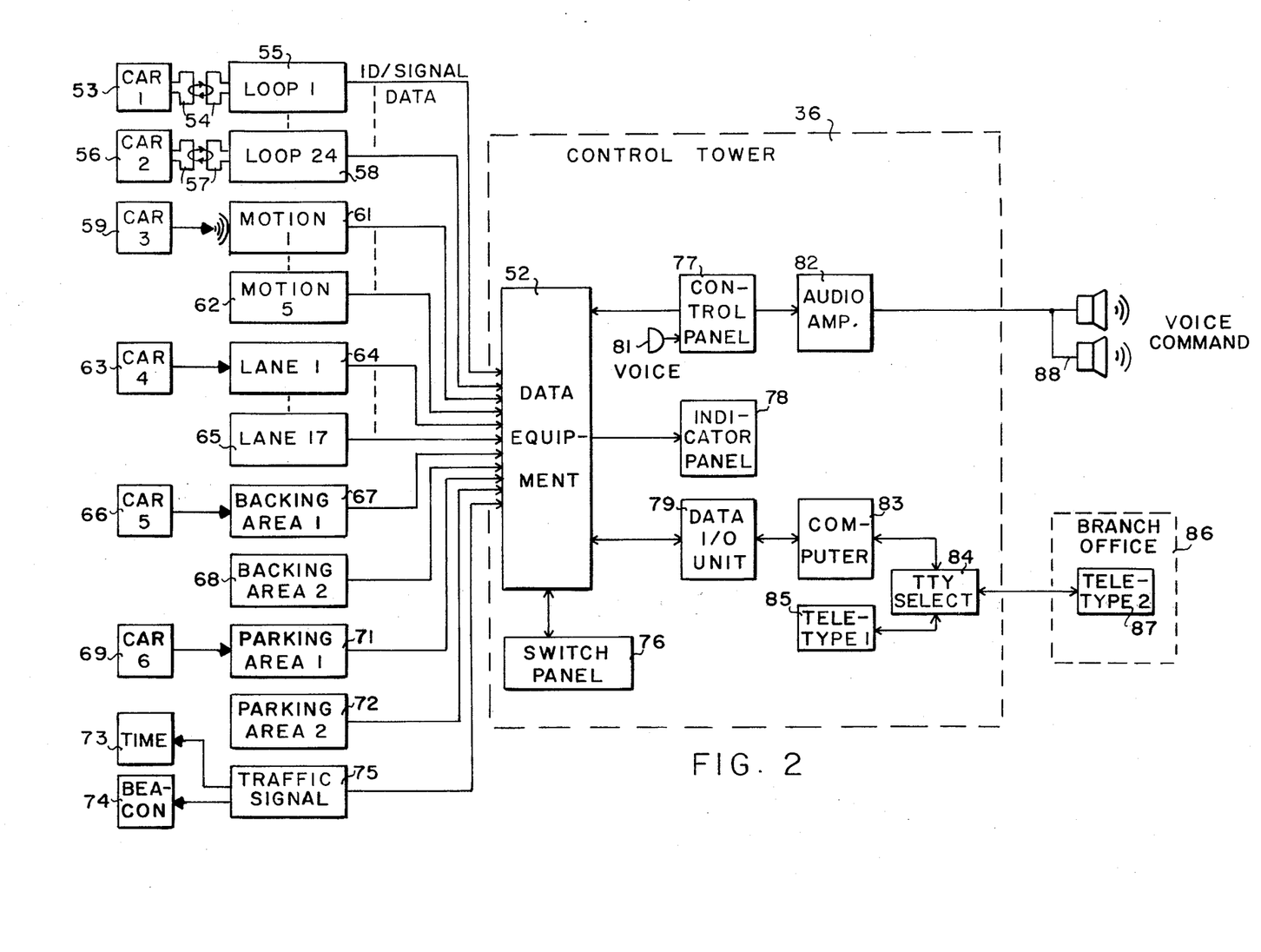
FIG. 2 is an overall block diagram of the communication system used in the apparatus shown in FIG. 1.

The test range shown in FIG. 1 can accommodate up to six vehicles simultaneously scattered about various portions of the range. The six different vehicles will be performing different activities, and part of the problem will be to identify the individual vehicles and connect them in any particular time with the particular portion of the range and the particular part of the test being performed. This can be done by dividing the range into zones, each of which contains a sensing coil 37. The block diagram in FIG. 2 is a very broad showing of one organization of known components which can be used to accumulate information about the operation of each vehicle. Shown are blocks 53, 56, 59, 63, 66 and 69 which represent six different vehicles. The vehicle 53 is shown in close inductive relationship with loop 55 which receives the identifying signal of the vehicle 53 and transmits it to a central data equipment 52 which is contained in the control tower 36. A second vehicle 56 is in close inductive relationship with a loop 58, connected to the data equipment 52 to provide an identifying signal for the vehicle 56. A third vehicle 59 is shown actuating the motion sensor 61, which is duplicated wherever such sensors are needed, such duplication being shown in FIG. 2 by the block 62. Vehicle 63 is shown actuating a pressure switch such as that used to demark the two lanes of traffic 11 and 31 along the main roadway of the range. The vehicle 66 is actuating another pressure-sensitive switch 67 which is located in one of the parking areas to indicate whether or not the vehicle 66 is parking within the boundaries of its particular slot. Vehicle 69 is performing a similar parking function and is actuating a similar pressure-sensitive switch 71. Additional parking sensors are indicated by the blocks 68 and 72. All of the signals from the sensors 55, 58, 61, 62, 64, 65, 67, 68, 71 and 72 are transmitted to the central data equipment 52. Examiner's control panels 77 and 78 are also located in the control tower 36. The control panel 77 is connected so as to supply information to the data equipment 52, and the control panel 78 is connected so as to receive information from the equipment 52. Also mounted on the control panel 77 is a microphone 81 for use by the examiner. A data input/output control unit 79, such as a standard computer handshake circuit, is connected in mutual communication relationship with the data equipment 52. Also connected to the data equipment 52 are switches 76 which can be used by the examiner to insert data for a particular vehicle. An output from the examiner's control panel 77 supplies voice signals to an audio amplifier 82 which drives speakers 88 mounted at selected locations around the range. The IO control unit 79 supplies information to and from a central computer 83 which may include a teletypewriter 85 and a remote teletypewriter 87 in a branch office 86, both of which are connected to the computer 83 through a teletypewriter select unit 84.

The test range shown in FIG. 1 is organized so that the sensor loops 37 which are located throughout the range are inductively coupled with a similar loop on that transmitter which is in its zone. All of the loops 37 are connected by appropriate wiring to the control tower 36 so that the identification of each vehicle as it is picked up by any of the loops is automatically transmitted to the data equipment 52. In addition to the identification of the particular vehicle, the other sensors, such as the motion sensors 61 and 62, or the lane sensors 64 and 65, or the parking sensors 67 and 68, also transmit signals to the data equipment 52. In the data equipment 52, the signals from the operation sensors (motion, lane, parking, etc.) are combined with the identification of the vehicle generating the signals so that the performance of each vehicle is automatically accumulated in the data equipment 52.

In operation, each car travels around the range of FIG. 1 in either the lane 11 or lane 31. As a vehicle travels along lane 31, it will depress the pressure-sensitive switches 27 which indicate the dividing line between the two lanes whenever it wanders from one lane to the other. The identification of the vehicle is picked up by loops 37 and transmitted to the equipment in the control tower 36 as the vehicle moves from zone to zone. Whenever it depresses a pressure-sensitive switch, this information is also transmitted to the data equipment 52, and through that equipment to the computer 83 in the control tower 36. When the vehicle reaches the railroad crossing 32, the signals 33 may be operating to indicate that a train is approaching the intersection. The signals can be operated under the control of the examiner from the console 77 through the data equipment 52 and the traffic signal control 75. The examiner is, of course, aware of the movement of each of the vehicles in the range. He may observe them from his position in the control tower 36, or he may be kept informed of their locations by means of suitable automatic displays connected with the computer 83. In any case, he may cause the railroad crossing signals 33 to operate. This information is also transmitted to the computer 83. The vehicle traversing lane 31 approaches the railroad crossing 32 and is identified to the computer 83 by means of the signal picked up by the loop 37 adjacent the railroad crossing. Also adjacent the railroad crossing but not shown in FIG. 1 are motion sensors, one for each of the lanes 31 and 11. Should the motion detector in lane 31 detect the fact that the vehicle did not stop at the flashing signal, it transmits this information from one of the sensors 61 or 62 to the computer 83. The vehicle continues along the lane 31 passing over the loops 37 at spaced intervals of time. The time interval between loops provides the computer with a good means for computing the speed of the vehicle. Should the computer determine the fact that the vehicle is proceeding in lane 31 at a speed which exceeds the posted limit, it stores this information together with the identification of the vehicle. Finally, the vehicle will reach the intersection 13 which is controlled by a flashing red and yellow beacon 14. Beacon 14 may be operating on a fixed time interval, flashing to denote emergency or off-hour conditions, or it may be under the manual control of the examiner in the control tower 36. These states of operation of the traffic light 14 can be determined by the examiner through the data equipment 52 and the traffic signal controller 75. Adjacent the intersection are motion sensors for each of the two lanes 11 and 31. Should the vehicle have a red light and not stop at the intersection 13, this information is transmitted to the computer 83 and is recorded together with the identification of the vehicle. At the intersection 13, the vehicle can make a right turn into the lane 12 and proceed to the next intersection 23 which may be controlled by a traffic controller 47. The vehicle should stop or proceed cautiously in accordance with the color of the light in its direction, and any action other than that required is detected by the motion sensors at the intersection and the information is transmitted to the computer 83 together with the identification of the vehicle.

At the intersection 23, the vehicle, under instructions from the control tower 36 or in accordance with a pre-printed and pre-selected programmed itinerary may make a right turn into the parking area 22. In the parking area 22, the vehicle driver may practice making a U-turn by operating his vehicle back and forth as he turns it. The identification of the vehicle is transmitted to the computer 83 through the loops 37, and any time the vehicle strikes what would be the curb, it passes over a pressure-sensitive switch which outlines the periphery of the parking area 22 and transmits that information to the computer 83. Having completed the turning test, the driver may proceed along the path 20 to a diagonal parking area 21. The parking area 21 has pressure-sensitive switches which outline the parking area itself and also which indicate the lane markers. As will be supplied in greater detail below, the diagonal parking areas also provide means for indicating when the vehicle is properly, or improperly, in the diagonal stall. From the parking area 21, the vehicle may proceed to the intersection 24 which is controlled by a stop sign, make a left turn down lane 15, and then a right turn at the other intersection 16 to the traffic gate 38. From there the vehicle may make a right turn to the control tower 36 where the driver will await the results of his test. As shown in FIG. 2, the data which is received from the various sensors distributed around the range is all transmitted through the data equipment 52 to the computer 83. The control panels 77 and 78 provide the examiner with means for controlling the traffic lights and the railroad signals as well as for broadcasting over loudspeakers 88 throughout the entire range. A remote branch office 86 may be located below the control tower 36, and a teletype unit 87 may be used to contact the computer 83 and obtain the results of any individual test. The manner in which these operations are carried out is explained in greater detail below.

Figure 3:
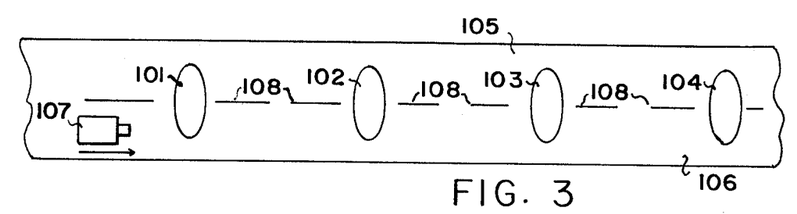
FIG. 3 is a portion of the range shown in FIG. 1 illustrating vehicle detection.

FIG. 3 shows two lanes 105 and 106 separated by a divider line 108 which constitutes pressure-sensitive switches. Straddling the two lanes are four loops 101, 102, 103 and 104. A vehicle 107 is indicated proceeding along the traffic lane 106. The spacing between the loops 101–104 should be such that if two vehicles were traveling in the same lane, they would be separated by a distance sufficient that they would not be identified by the same loop. For a speed limit of 20 miles per hour, a reasonable separation of loops has been determined to be around 60 feet. Assuming that the loops 101–104 are separated from each other by a fixed distance D, the average speed can be determined by measuring the time that the vehicle requires to travel the distance between the loops. Thus, $$S_A = \frac{D}{t}.$$

Checking the loops for information at a rate of ten times a second, the speed error would be within ±5 percent. By dividing the entire range into 60-foot zones each of which contains an identification loop and sequentially reading all of the activities in the zones, any violation occurring in any zone can be charged to the vehicle in that zone at the time of the violation. Vehicle violation tabulations are thusly made simple.

Figure 4:
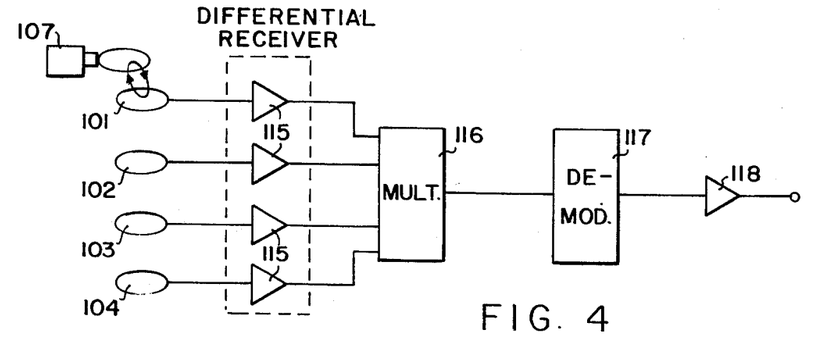
FIG. 4 is a sample circuit used with the apparatus shown in FIG. 3.

FIG. 4 illustrates a plurality of loops 101–104 with the vehicle 107 adjacent the loop 101. The outputs of the loops 101–104 are applied to the inputs of differential receivers 115, one such receiver for each of the loops. The outputs of receivers 115 are transmitted over transmission lines to the input of a multiplexing circuit 116 whose output is transmitted to the input of a demodulator 117 which can also be called a demultiplexer. The output from the demodulator 117 is applied through amplifier 118 to the input of the computer 83. The differential receivers 115 cause any noise picked up in the loops or on the lines to be cancelled.

Apparatus shown in FIG. 4 is one form of sequencing arrangement which can be used to transmit the identifications of the vehicles using the range at any time while avoiding confusion due to the fact that a plurality of vehicle identifications are being handled at any time. The vehicle 107 has a loop on its transmitter and that loop is shown in inductive coupling relationship with the loop 101. Not shown but possible is a second vehicle which is in inductive relationship with the loop 102, and a third vehicle in inductive relationship with loop 103, etc. The signal outputs from the loops 101–104, which outputs constitute the identifications for the individual vehicles, are amplified by the respective amplifiers 115 and are applied as separate inputs to the multiplexer 116. The multiplexer 116 could be any standard multiplexer such as a plurality of gating circuits arranged in parallel and having a common output line and one form is shown in detail below. By the use of clock and addressing signals, the individual gating circuits, or inputs to the multiplexer 116, are individually scanned in sequence so that at any instant only one vehicle identification is being transmitted to the demodulator 117. The demodulator 117 reproduces the original signal, and the output of the demodulator can be applied to the data equipment 52 together with the other signals generated by the operation of the vehicle 107. As mentioned above, the range can be divided into a plurality of zones with each zone containing a single sensing loop. By the use of the multiplexing-/demultiplexing system shown in FIG. 4, each vehicle can be placed in a particular zone. Each zone which is used for a particular purpose, such as the zones controlled by traffic lights or those zones used for parking or U-turns, can be readily identified with a particular vehicle at a particular time so that the performance of the vehicle driver can be readily checked against the desired standards. In a time multiplexing system, the zones can be identified merely by the labeling of the timing pulses used to read the information from each zone so that the computer 83 can always maintain a check on the location of each of the vehicles using the range.

Figure 5:
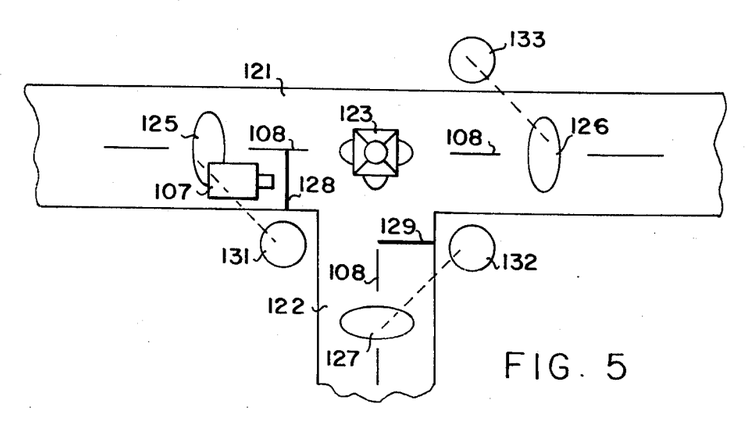
FIG. 5 is a plan view of an intersection controlled by a traffic light.

One of the operating characteristics of the applicants being tested on the test range is how they obey traffic signals such as stopping at those intersections which are controlled by traffic lights or stop signs or at the railroad crossing when an approaching train is signalled. A simple means for detecting motion, or lack of it, at any desired location is an acoustic type of motion detector which detects motion by means of a frequency shift. The common term for a device of this nature presently used on our highways is a radar speed indicator. The ultrasonic signals are generated by means of polycrystalline piezoelectric transducers which are usually made directional in transmission. A typical intersection with motion detectors is shown in FIG. 5 in schematic form. The intersection of a through street 121 and a side street 122 which does not cross the street 121 is controlled by a traffic light 123. The two traffic lanes on each street 121 and 122 are separated by the standard pressure-sensitive devices 108, and the street 121 shown in FIG. 5 contains identification loops 125 and 126, while that portion of the street 122 shown in FIG. 5 contains only a single loop 127. A vehicle 107 is shown at the stop line 128 on the street 121 in inductive relationship with the loop 125. A motion detector 131 is located adjacent the street 121 at the intersection with its direction of transmission and reception pointed toward the location a vehicle would occupy if it were stopped at the stop line 128. A second motion detector 132 is adjacent the intersection aimed toward the loop 127 on the street 122, and a third motion detector 133 is located adjacent the intersection on the other side of the street 121 aimed toward the loop 126. Thus, two motion detectors service the street 121, one such motion detector for each lane of traffic, and one motion detector 132 services the street 122.

The vehicle 107 is shown in FIG. 5 adjacent the stop line 128. If the traffic light were red along the street 121, it would be incumbent upon the driver of the vehicle 107 to stop his vehicle at the stop line 128. The state of the traffic signal 123 is transmitted to the data equipment 52 and thence to the computer 83 as is the identification of the vehicle 107 by the loop 125. At the same time, the motion detector 131 indicates to the data equipment 52 whether or not the vehicle 107 is actually at rest or is, in fact, in motion. As mentioned above, this is achieved by the motion detector 131 transmitting an ultrasonic signal in a direction such that it intercepts the vehicle 107. Ultrasonic energy is reflected from the vehicle 107 back toward the detector 131. The motion of the vehicle 107 is determined by a shift in frequency between the transmitted and the received signals in the motion detector 131. If the vehicle 107 is at rest, the signal which is reflected back to the detector 131 is of the same frequency as that which was transmitted. If, however, the vehicle 107 is in motion, then the signal reflected back will be shifted in frequency so that a higher frequency signal will be received than that which was transmitted. This can be readily determined in the detector 131 by the use of a circuit which measures frequency difference or by a simple tuned filter arrangement. The final signal is transmitted to the data equipment 52 to indicate to the computer whether or not the operator of the vehicle 107 is actually stopped at the red light 123.

Figure 6:
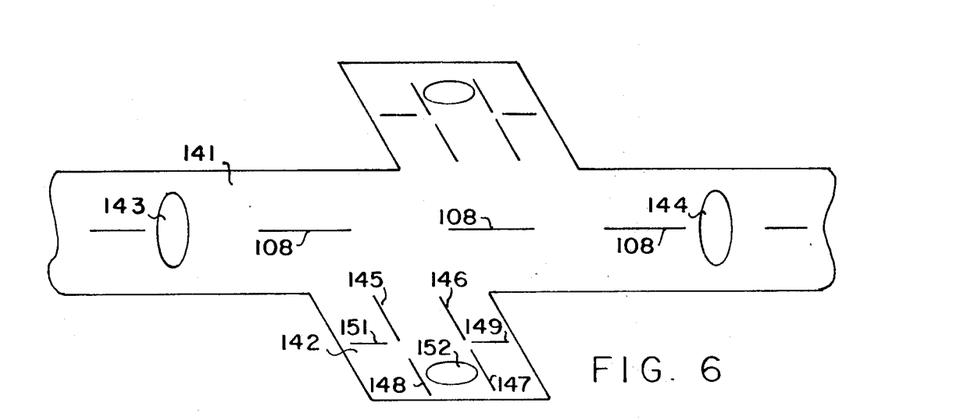
FIG. 6 is a plan view of a parking area.

FIG. 6 shows a portion of a road 141 having two lanes of traffic and containing two identification loops 143 and 144. Each lane of traffic along the roadway 141 has extending from it at one point a section 142 which contains three lanes for diagonal parking. The stalls are separated by pressure-sensitive switches 145, 146, 147 and 148, and the center stall at its far end contains a vehicle identification loop 152. In addition to the switches 145–148, pressure-sensitive switches 149 and 152 are also provided to indicate whether or not the vehicle is sufficiently far into the parking stall.

The apparatus shown in FIG. 6 is provided to test the ability of a driver to pull into a diagonal parking stall without straddling the demarcation line separating the stalls and without hitting the curb at the far end. As the vehicle travels along the roadway 141, it is identified by the transmission from the loops 143 and 144. When the driver turns into the parking section 142 and attempts to park his car in one of the three stalls provided, his success will be indicated by his avoidance of the pressure-sensitive switches 145–148 and 149 and 151. Should the operator have his wheels on any of the pressure-sensitive switches 145–148 separating the stalls, this information will be transmitted to the data equipment 52 and to the computer 83. Should the vehicle straddle the lines demarking the boundaries marking the stalls but not rest on the switches 145–148, they will pass over one or the other of the switches 149 or 151 to indicate this condition. The loop 152 at the end of the parking area indicates the vehicle which is in that particular parking area and also serves as a zone indicator.

Figure 7:
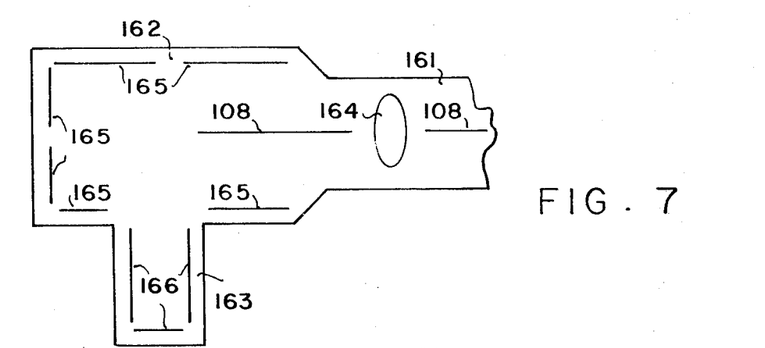
FIG. 7 is a plan view of a U-turn area used in the range of FIG. 1.

The turn-about area is shown in schematic form in FIG. 7 which shows a portion of a roadway 161 having two traffic lanes separated by the standard pressure-sensitive strips 108. The two lanes enter into a turn-around area 162 past a loop 164. The turn-around area comprises an enlarged area of the roadway which is dead-end and which has a driveway portion 163 extending from one side thereof. The periphery of the enlarged area 162 is parallel with pressure-sensitive switches 165. The driveway 163 also has pressure-sensitive switches arranged around its perimeter. A vehicle enters the area 162 passing the loop 164 which indicates that vehicle's presence in the zone 162. The driver may then make a U-turn by pulling forward and backing his vehicle until he has completely turned his vehicle around to proceed out of the enlarged area 162, again past the loop 164. The U-turn is to be made without the wheels of the vehicle touching the curb. The pressure-sensitive strips 165 indicate when the vehicles do strike the curb. Indications of actuated switches 165 together with the identification of the vehicle via the loop 164 are stored in the computer 83 to be scored against the driver of the vehicle. The driveway portion 163 may be used the same way. The driver may drive his vehicle in the driveway portion 163 and stop before the front wheels strike the curb to actuate the switches 166. As the vehicle leaves the area 162, the loop 164 signals this fact to the data equipment 52.

As mentioned several times heretofore, the entire test range is divided into zones with one loop 37 in each zone. The automatic equipment in the tower 36 scans the outputs from the loops 37 in sequence so that at any time one loop is queried, and the equipment knows which loop it is. The presence of a vehicle in the zone being queried is indicated by the presence of a signal from the loop in that zone. When there are several vehicles sharing the range at the same time, each is identified by its own signal frequency. In addition, the vehicle mounted transmitters are equipped with means for indicating the state of the vehicle's turn signals at any time.

Figure 8:
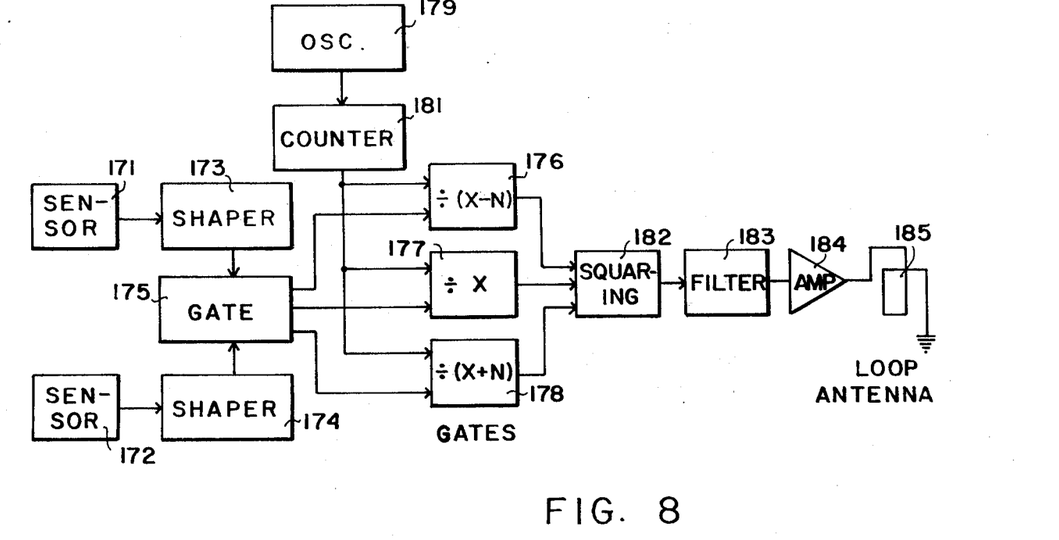
FIG. 8 is a block diagram of the vehicle transmitter which may be used in the range of FIG. 1.

One form of transmitter suitable for use in the system of this invention is shown in block form in FIG. 8, in which a crystal oscillator 179 has its output applied to a counter 181. The contents of the counter 181 are applied to the inputs of three sets of gates 176, 177 and 178. Each of the sets of gates 176–178 is controlled by the application of a control signal to its control input. A left photosensor 171 is attached to the left turn signal of the vehicle and has its output applied to the input of a pulse shaper 173 whose output is applied to one input of a gating circuit 175. A right photosensor 172 is attached to the right turn signal and has its output applied to the input of a pulse shaper 174 whose output is also applied to an input of the gating circuits 175. The outputs from the gating circuits 175 are individually applied to the inputs of the gates 176–178 whose outputs are all applied to a squaring circuit 182. An active filter 183 has its input connected to the output of the squaring circuit 182, and the output from the active filter 183 is applied through an amplifier 184 to the loop antenna 185 on the vehicle transmitter.

The crystal oscillator 179 may be any suitable oscillator, but preferably it has removable crystals and filters so that the frequency of the oscillator may be changed at will. The oscillator 179 drives the counter 181 which is, in essence, a frequency divider. The counter 181 has three outputs which it applies to the inputs of the gates 176–178. Which gate 176–178 is conductive to pass the counter outputs depends upon the signals applied from the gating circuits 172, whose output is, in turn, dependent upon the output of the pulse shapers 173 and 174. The intermittent operation of a vehicle turn signal causes the affected photosensor 171 or 172 to generate output pulses - one for each flash of the direction signal. The output pulses from the photosensors 171 or 172 are shaped in the shaper 173 or 174 (which are one-shots) and applied to the input of the gating circuits 175. The gating circuits 175 are so arranged that when a signal input is applied to it from the left photosensor, it generates output pulses on the top output line; when input pulses are applied to it from the right photosensor 172, it produces output pulses on its bottom line; and when it receives input pulses from neither of the photosensors 171 and 172, it produces output pulses on its center line. Thus, one or another of the gates 176–178 is driven from the counteer 181, depending upon which of the output lines from the gating circuits 181 is energized. The output from the gates 176–178, only one of which is passing information at any time, is applied through the squaring circuit 182 to shape the pulses, the active filter 183 which transforms the signal into a sine wave, and the amplifier 184 to the antenna 185. The signals applied to the antenna 185 induce similar signals in any of the loops adjacent the antenna.

The counter 181 together with the set of gates 176–178 can be considered a frequency divider which divides by 19, 20 or 21. The circuits 176–178 are used to derive unique frequencies for the three conditions of the directional signals; right on, left on, and both off. A 5 percent difference in the frequency of the outputs of gates 176–178 is sufficient to provide clear separation of the signals. Thus, if the gate 176 output divides by 19, the gate 177 output divides by 20, and the gate 178 output divides by 21, a 5 percent separation in frequencies is achieved. In addition, the squaring circuit 182 can readily be a binary counter stage which further halves the frequency output and produces a square wave. That square wave is effectively converted into a sine wave by the filter 183 having a frequency which, in the example used, is 1/40 times that of the oscillator 179. Since the frequency shift produced by the directional signals is effective only during the interval that the affected photosensor 171 or 172 is energized, it is possible that between flashes of the directional signals the vehicle could travel a distance sufficient to break the coupling between the transmitter and the closest loops 37. To prevent this and the loss of an important signal, the one-shot pulse shapers 173 and 174 are provided. Each is triggered by the output of the respective photosensor 171 and 172 and remains in the set condition long enough to ensure that the frequency shifted signal is detected by a loop 37.

Figure 9:
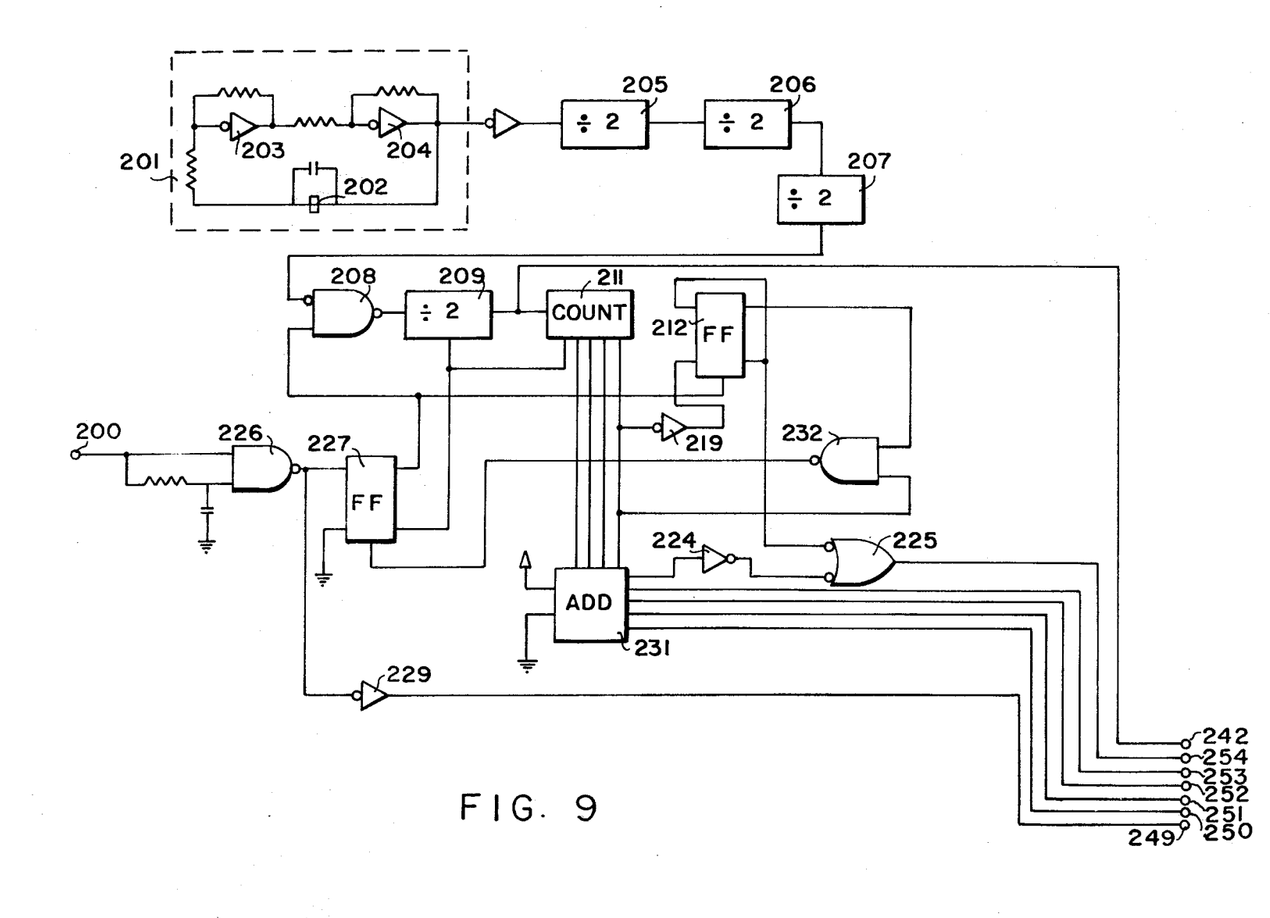
FIG. 9 is a block diagram of a timing and loop identification apparatus which may be used in the range of FIG. 1.

In addition to the vehicle unit which identifies the vehicle by frequency and indicates the state of the directional signals at any time, the range also includes means for identifying the location of the vehicle on the range. One such apparatus is shown in FIG. 9 in which a crystal oscillator 201 provides clock pulses which are applied through a frequency divider comprising binary counter stages 205, 206 and 207 to one input of an AND gate 208. An input terminal 200 receives the start pulse which is applied through a pulse shortener 226 to the set input of a flip-flop 227, and through another inverter 229 to an output terminal 249. The set output from the flip-flop 227 is applied to the other input of the gate 208 and also to the restore input of another flip-flop 212. The one output of the binary counter stage 209 is applied to the count input of a counter 211 and to the output terminal 242. The restore output of the flip-flop 227 is applied to the reset inputs of both the binary counter stage 209 and the counter 211 which has four binary outputs applied in parallel to the inputs of an addressing register 231. Four of the address outputs from the register 231 are applied to output terminals 250, 251, 252 and 253, and the fifth output (the most significant digit) is applied through an inverter 224 to the input of a NOR gate 225. The output from the gate 225 is applied to an output terminal 254. The restore output from the flip-flop 212 is also applied to the set input of the flip-flop and to the other input of the gate 225.

When a start signal is applied to the input terminal 200, it is shortened by the shortener 226, and the shortened pulse sets the flip-flop 227 which clears the flip-flop 212 and applies one input to the gate 208. The other input to the gate 208 comes from the binary counter stage 207 which is the clock signal divided in frequency by a factor of 8. The output from the gate 208 is further divided by a count of 2, and is then applied as an input to the counter 211 which accumulates the pulses. Each time the counter 211 receives another input pulse, its count changes, and this changes the inputs to the register 231. The output from the register 231 is the address of the loop being queried at the time. This address appears on the terminals 250, 251, 252, 253 and 254. The apparatus shown in FIG. 9 is a timing and addressing circuit for the system.

As mentioned above, the loops 37 placed around the range serve as pickups to signal to the computer 83 the presence of any vehicle. That vehicle can be identified by the frequency of the signal produced by its transmitter. It is important to be able to place each vehicle in the range at the particular location in the range. To this end, the range is divided into zones, each zone falling between two loops 37. Each zone is also given an address, so that when a loop 37 signals the presence of a vehicle in its zone, not only can the vehicle be identified, but the zone itself can also be identified. In order to be able to identify the zones at the control tower 36, the loops 37 are scanned in sequence, and each time a loop is addressed, the address of its zone is presented to the computer 83 and to display apparatus (not shown) in the control tower 36. The zone addresses and the timing pulses for the sequential scanning are produced by the apparatus shown in FIG. 9. The oscillator 201 produces pulses at a fixed rate. The frequency of the oscillator output is divided down to a rate which permits proper stepping of the loop scanning. The loops 37 should be scanned at a rate of about one per four milliseconds. The output from the oscillator 201, after being reduced in frequency, is applied to an input of the AND gate 208, and the start input signal from the input terminal 200 is applied to the other input of the gate 208. When the start signal is present, the gate 208 passes the timing pulses to the counter 211. Counter 211 is a four-stage counter, and the four outputs from the counter are applied in parallel to inputs of an addressing register 231. The register 231 also includes encoding means so that the final code comprises five binary digits which are applied to terminal 250–254. A clear signal is applied from the terminal 200 through an inverter 229 to the output terminal 249 to clear the receiving devices at the beginning of a cycle. The computer 83 applies periodic synchronizing and recycling pulses to the input terminal 200 to initiate new addressing and multiplexing cycles, and the signal applied to the output terminal 242 is applied to the computer 83 as an interrupt signal to ensure that the computer is ready to act upon the information transmitted to it. It should be understood that the addressing of all of the loops 37 takes place in real time at about one hundred milliseconds so that there is sufficient time between reading successive loops to be able to determine the speed of travel of a vehicle. As mentioned above, since the loops 37 are a fixed and known distance apart - about 60 feet - the speed of a vehicle can be determined simply and rapidly merely by measuring the time it takes the vehicle to travel between successive loops. Actually, all of the loops are scanned once each 100 milliseconds. If the distance between loops 37 is 58 feet, the accuracy with which the system can determine whether or not a vehicle is exceeding the 20 mph speed limit is 5 percent. This is a simple computation which can be performed quite readily by the computer 83. The output signal appearing at the terminal 242 is a clock pulse which can be used to operate the scanning the timing circuits in the system.

Figure 10:
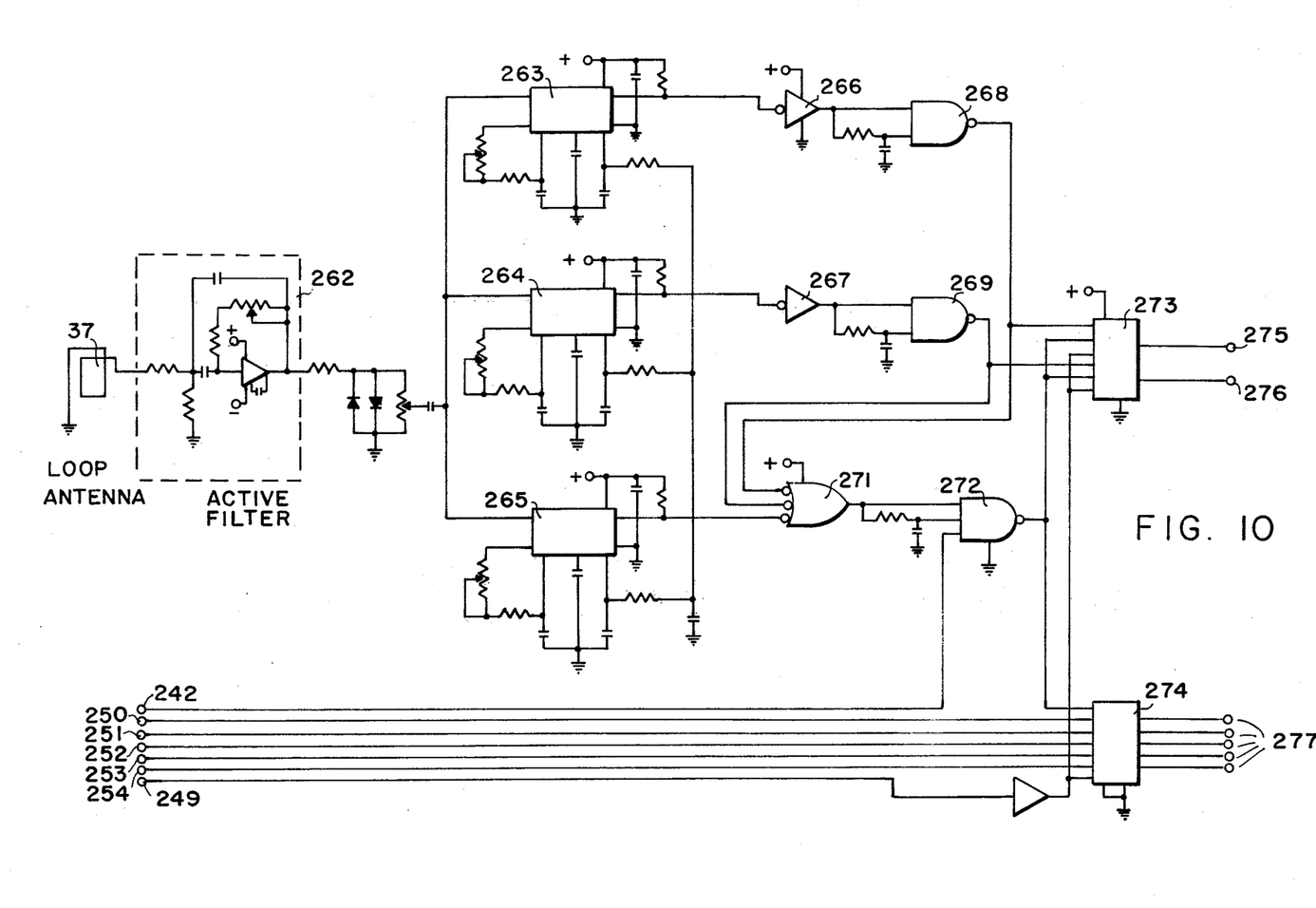
FIG. 10 is a block diagram of the vehicle detector which may be used in the range of FIG. 1.

FIG. 10 depicts in schematic block form a unit for decoding the vehicle information picked up by the loops 37. A loop antenna 37 feeds the signals induced in it through the differential receivers, transmitters and amplifiers in the transmission path to the input of an active filter 262, whose output is differentiated and passed on to the inputs of three tone decoders 263, 264 and 265. Each of the tone decoders 263–265 comprises a phase locked decoder for one of the signals transmitted by the vehicle transmitters. The output from the decoder 263 is applied to an inverter 266 and pulse shortener 268; the output from the decoder 264 is applied through an inverter 267 to a shortener 269; and the output from the decoder 265 is applied to one input of a NOR gate 271, and from the gate 271 to a shortener gate 272. The outputs from the shorteners 268, 269 and 272 are applied to separate inputs of a register 273. The register 273 has two outputs, one which indicates a right turn signal and one which indicates a left turn signal. At the same time, the output from the shortener 272 is also applied to one input of a register 274 to which are connected the five loop address lines 250–254. The clock signal on line 242 is applied to another input to the gate shortener 272 to open the gate whenever a clock pulse appears with the other signals, and the clear signal on the line 249 is applied to the clear input of the registers 273 and 274.

When the system is operating, the loop antenna 37 picks up the transmissions from any vehicle which is in its range of reception. The signals induced in the antenna 37 are transmitted to the active filter 262 which tends to limit the information to the frequency of the vehicle to which the particular demodulator responds.

In the range system there is one demodulator for each vehicle using the range. The active filter is tuned to the frequency of the particular vehicle transmitter to which it is to respond. In this way, the signal-to-noise ratio is maintained at a usable level. The incoming signals from the filter 262 is differentiated and then passed on to the three phase locked decoders 263, 264 and 265. The decoder 263 is tuned to a particular left turn frequency; the decoder 264 is tuned to the right turn frequency; and the decoder 265 is tuned to the center frequency of the vehicle transmitter. When a signal is picked up by the loop 37, one of the three decoders is tuned to that signal and produces an output signal. The outputs of the three decoders 263–265 are all applied to the input of the NOR gate 271 whose output is applied to the registers 273 and 274. When any of the decoders 263–265 produces an output, the register 274 is conditioned to pass on the address of the loop 37 being queried at the time. Thus, it is the signal from the vehicle transmitter which alerts the computer 83, and any display equipment in the control tower 36, to the address of the loop being queried. The same signal from the gate 272, together with one of the signals from the decoders 263 or 264 produces an output signal from the register 273. One of the two output lines from the register 273 is energized at any time depending upon whether the right or the left turn signal is operating. If neither of the turn signals on the vehicle is operating, then there is only an output from the decoer 265; this output is not applied to the register 273; and the register 273 does not energize either of its output lines. When the addressing system has queried all of the loops 37, the information is transmitted to the computer 52, and a clear signal is generated on the line 249, and this clears the two registers 273 and 274.

As mentioned above, there are as many decoder assemblies in a system as there are different vehicle transmitters. Each of the decoder assemblies is tuned to the frequencies of a single vehicle transmitter. In this way, each vehicle is positively identified.

At this point a summary of the overall construction and operation of the entire range would be in order. The driver test range of this invention comprises a plurality of stations distributed around a driving track which simulates a common roadway carrying two-way traffic. Each station is designed to test the ability of the driver being tested to perform one or more normal driving tasks such as parking, turning, etc. At suitable locations around the track there are distributed standard traffic control signals including traffic lights and beacons. At the intersections which are controlled by stop signs or traffic lights, motion detectors detect the movement of a vehicle so that the observance of the STOP command is checked. Spaced around the track at about 60-foot intervals are a plurality of antenna loops 37 which detect the presence of a vehicle. The loops 37 may be mounted in any suitable location such as buried in the roadbed. Built into the range but not shown or described herein are channels or conduits for cables which connect all of the antenna loops 37, the motion detectors 131, 132, 133, the traffic lights 47, beacons 14 and other range equipment with the control tower 36 in which is located the test examiners and the electronic testing and display equipment. In general, it can be assumed that all of the loops and other equipment are connected into the gear — including the computer 83 — in the control tower 36 in parallel. The data equipment 52 in the control tower 36 contains multiplexing apparatus which connects each of the loops 37 to the computer 83 and examiner's console 78 in sequence, with means for identifying which loop is being connected in at any time. Each vehicle in the test range has temporarily mounted on it a small transmitter which transmits a unique central frequency signal. When one of the directional signals on the vehicle is activated, the transmitter frequency of that vehicle has its output frequency shifted about 5% higher or lower, depending upon which direction signal is activated. A signal of the same frequency is induced in the loop immediately adjacent the vehicle, and that signal is transmitted to the data equipment 52. When the data equipment 52 connects that loop to the examiner's console 78 and to the computer 83, the vehicle signal is applied to the computer 83 and to the examiner's console.

The examiner's console 78 typically includes a display of some sort. Although the details of that display are not necessary to a complete understanding of the invention, some description of a typical display may be of interest. One form of display is a cathode ray tube display which is connected to the computer to display in alpha-numeric form information which is in storage in the computer. Such a display may also include means for displaying a picture of the range with all of the loops shown thereon and cursors which indicate the positions of the vehicles at any time. Another form of display may be a backlighted board having pictured thereon the track layout with the zones marked. The zone being interrogated by the equipment and producing a signal could be lighted by controlling lights behind the panel board whenever a signal is received. In such apparatus, the occurrence of a vehicle signal would cause the decoding of the loop address to cause that loop to be identified. Other forms of display apparatus may, of course, be used.

The loops would be scanned each tenth of a second. This means that all of the loops would be interrogated in 100 milliseconds or less, and each 0.1 second the same loop would be queried. At that rate, a vehicle would indicate its presence at a loop for several cycles. In addition, it provides time for an examiner to select which vehicle he wishes shown on the display and have its location indicated before the location of the other vehicles would decay. As shown in the drawings and described above, the vehicle transmitter could be rather simple with provision for signalling the condition of either turn signal or the lack of operation of the directional signals. Each vehicle transmitter is constructed the same except that the frequencies of transmission would differ. By the same token, the data equipment 52 contains one decoder for each of the vehicle transmitters in operation. The decoders are tuned to the frequencies of the individual transmitters, and each decoder has its own outputs. When a transmitter signal is decoded, the address of the loop receiving the signal is transmitted by the data equipment 52 to the computer 83 and to the examiner's console 78. The identity of the vehicle is produced by the identification of which decoder responded to its signal, and its location in the range is indicated by the address of the loop which received the transmission. At the same time, the operation of the various permanent equipment located about the track is also indicated by the location. Thus, should a vehicle be stopped adjacent a stop sign, the presence of that vehicle and its location are signalled by the transmission which is received by the loop at that location. The motion detector which controls that location also transmits its condition to the data equipment 52. Thus, the data equipment receives an indication that a vehicle is at a location where there is a stop sign, and, at the same time, it receives an indication that the vehicle is, or is not, moving. In the same manner, the data equipment receives indications from the pressure switches that a vehicle has crossed the center line, or is not parked properly, or has struck the curb in turning, or any of the other indications built into the range. Since each vehicle is readily identified and its location is always known, the computer 83 has no difficulty in accumulating a history of each vehicle's stay in the range. From this information it can create a test score based upon the weighted values set for each of the correct and incorrect actions of each vehicle. A computer print-out of the test evaluation and results can be presented to the driver with his score so that there is no question about the errors in driving made by each driver.

The above specification has described a new and improved test range for testing the drivers of vehicles to produce clear, careful and unbiased test results from an automatically operated test range. It is understood that a reading of the above description may indicate to others in the art additional ways in which the principles of this invention may be used without departing from its spirit. It is, therefore, intended that this invention be limited only by the scope of the appended claims.

What is claimed is:

1. A system for automatically testing the ability of individual drivers to drive motor vehicles, said system comprising:
   a. a first roadway upon which motor vehicles may be driven;
   b. vehicle presence detectors located around said first roadway at known spaced positions;
   c. transmitter means adapted to be carried by vehicles using said first roadway for transmitting unique signals to be received by said presence detectors;
   d. a central control station to which all of said presence detectors are connected;
   e. means at said station for identifying individual presence detectors so that the location of a vehicle on said first roadway is readily determined; and
   f. means for separating said first roadway into two parallel lanes, said separating means including signalling means, and means for connecting said signalling means to said station so that said station is signalled whenever a vehicle crosses from one lane to another.

2. The system defined in claim 1 further including computation and timing means at said station so that the time required for a vehicle on said first roadway to pass between detectors may be measured and the speed of that vehicle computed.

3. The system defined in claim 2 wherein said computation means includes means for accumulating all signals and indications pertaining to each vehicle using said system and for arriving at a pass-fail grade for each driver.

4. The system defined in claim 1 further including at least a second roadway which intersects with said first roadway at a first intersection, traffic control means located at said first intersection for controlling the passage of traffic along said first and said second roadways, and motion detectors located at said first intersection for indicating to said station when a vehicle at said first intersection is not stationary.

5. The system defined in claim 1 further including additional spaces adjacent said first and second roadways provided for parking and for turning motor vehicles, and sensors in said additional spaces for indicating to said station when a vehicle performs an undesirable maneuver.

6. The system defined in claim 1 wherein said transmitter means includes a wave generator adapted to generate selectively any of three output frequencies, one such frequency being generated when said vehicle is signalling for a left turn, and a third such frequency when said vehicle is not signalling for a turn.

7. The system defined in claim 6 wherein said transmitter means includes a plurality of transmitters, each of which transmitters operates at a unique central frequency different from the central frequency at which the other transmitters operate to uniquely identify the individual vehicles upon which said transmitters are carried.

8. The system defined in claim 7 further including demodulating means at said station, said demodulating means comprising a plurality of sets of frequency detectors, each of said sets of frequency detectors comprising three separate tone detectors in which one of said tone detectors is tuned to the central operating frequency of one of said transmitters, and means for applying the signals from the sampled presence detectors to all of said sets of frequency detectors to produce an indication of which vehicle is adjacent each presence detector.

9. The system defined in claim 6 wherein said identifying means includes means for sampling the outputs from the individual presence detectors one at a time, means for maintaining an indication of which detector is being sampled at any instant, and means for generating an identifying code representative of each detector as it is being sampled.

10. The system defined in claim 9 wherein said transmitter means includes a plurality of transmitters, each of which transmitters operates at a unique central frequency different from the central frequency at which the other transmitters operate to uniquely identify the individual vehicles upon which said transmitters are carried.

11. The system defined in claim 10 further including demodulating means at said station, said demodulating means comprising a plurality of sets of frequency detectors, each of said sets of frequency detectors comprising three separate tone detectors in which one of said tone detectors is tuned to the central operating frequency of one of said transmitters, and means for applying the signals from the sampled presence detectors to all of said sets of frequency detectors to produce an indication of which vehicle is adjacent each presence detector.

12. The system defined in claim 1 wherein said identifying means includes means for sampling the outputs from the individual presence detectors one at a time, means for maintaining an indication of which detector is being sampled at any instant, and means for generating an identifying code representative of each detector as it is being sampled.

* * * * *